US010693511B1

(12) United States Patent
Sung et al.

(10) Patent No.: US 10,693,511 B1
(45) Date of Patent: Jun. 23, 2020

(54) WIRELESS USER SIGNAL RECEPTION BASED ON MULTIPLE DIRECTIONS-OF-ARRIVAL

(71) Applicant: Sprint Communications Company L.P., Overland Park, KS (US)

(72) Inventors: Sanghoon Sung, Ashburn, VA (US); Yu Wang, Fairfax, VA (US); Udit A. Thakore, Fairfax, VA (US); George William Harter, III, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/290,157

(22) Filed: Mar. 1, 2019

(51) Int. Cl.

| | |
|---|---|
| ***H04B 7/0452*** | (2017.01) |
| ***H04B 1/10*** | (2006.01) |
| ***G01S 3/06*** | (2006.01) |
| ***G01S 3/04*** | (2006.01) |
| ***H04W 64/00*** | (2009.01) |
| *H04W 88/08* | (2009.01) |

(52) U.S. Cl.
CPC ............ *H04B 1/1081* (2013.01); *G01S 3/043* (2013.01); *G01S 3/06* (2013.01); *H04B 1/1027* (2013.01); *H04B 7/0452* (2013.01); *H04W 64/006* (2013.01); *H04W 88/085* (2013.01)

(58) Field of Classification Search
CPC .. H04B 1/1081; H04B 1/1027; H04B 7/0452; G01S 3/06; G01S 3/043; H04W 64/006
See application file for complete search history.

(56) References Cited

U.S. PATENT DOCUMENTS

| | | | | |
|---|---|---|---|---|
| 7,317,770 | B2 | 1/2008 | Wang | |
| 7,864,885 | B2 | 1/2011 | Cleveland et al. | |
| 8,654,912 | B2 | 2/2014 | Cleveland et al. | |
| 2011/0013711 | A1 | 1/2011 | Wang et al. | |
| 2011/0250921 | A1 | 10/2011 | Reial | |
| 2014/0218240 | A1* | 8/2014 | Kpodzo .................. | G01S 19/21 342/450 |
| 2015/0117395 | A1 | 4/2015 | Hadani et al. | |
| 2016/0103199 | A1 | 4/2016 | Rappaport | |
| 2019/0285722 | A1* | 9/2019 | Markhovsky .......... | G01S 19/05 |

FOREIGN PATENT DOCUMENTS

| | | | | |
|---|---|---|---|---|
| EP | 2246846 | A1 | 11/2010 | |
| EP | 2315200 | A1 | 4/2011 | |
| WO | 2009099151 | A1 | 8/2009 | |
| WO | WO-2012149276 | A1 * | 11/2012 | .............. G01S 3/74 |

* cited by examiner

*Primary Examiner* — Mohamed A Kamara

(57) ABSTRACT

Radio circuitry wirelessly serves User Equipment (UE) with dynamic direction-of-arrival reception. Control circuitry determines a primary direction-of-arrival for a user signal and configures a digital filter for the primary direction-of-arrival. Detection circuitry filters the user signal with the digital filter configured for the primary direction-of-arrival and recovers user data from the user signal. The control circuitry determines increased radio noise and/or uplink utilization reconfigures the digital filter for multiple directions-of-arrival. The detection circuitry filters a subsequent user signal with the digital filter configured for the multiple directions-of-arrival and recovers additional user data from the subsequent user signal.

20 Claims, 6 Drawing Sheets

201
RADIO CIRCUITRY 110 RECEIVES A WIRELESS USER SIGNAL FROM UE 101. THE WIRELESS SIGNAL HAS A DIRECTION-OF-ARRIVAL AND TAKES MULTIPLE PATHS.

202
CONTROL CIRCUITRY 110 DETERMINES A PRIMARY DIRECTION-OF-ARRIVAL FOR THE WIRELESS USER SIGNAL.

203
CONTROL CIRCUITRY 110 CONFIGURES A DIGITAL FILTER IN DETECTOR CIRCUITRY 112 FOR THE PRIMARY DIRECTION-OF-ARRIVAL.

204
IN DETECTOR CIRCUITRY 112, THE DIGITAL FILTER FILTERS THE RECEIVED USER SIGNAL BASED ON THE PRIMARY DIRECTION-OF-ARRIVAL AND RECOVERS THE USER DATA.

205
CONTROL CIRCUITRY 111 DETERMINES RADIO NOISE AND/OR UPLINK UTILIZATION.

206
> TH?
YES
NO

207
CONTROL CIRCUITRY 111 RECONFIGURES THE DIGITAL FILTER IN DETECTOR CIRCUITRY 112 FOR MULTIPLE DIRECTIONS-OF-ARRIVAL.

208
IN DETECTOR CIRCUITRY 112, THE DIGITAL FILTER FILTERS THE RECEIVED USER SIGNAL BASED ON MULTIPLE DIRECTIONS-OF-ARRIVAL AND RECOVERS THE USER DATA.

WIRELESS USER SIGNAL RECEPTION BASED ON MULTIPLE DIRECTIONS-OF-ARRIVAL

TECHNICAL BACKGROUND

Wireless user devices exchange wireless signals with wireless communication networks for data services like voice-calling, internet-access, and media streaming. The wireless communication networks have wireless access points that exchange the wireless signals with the wireless user devices. The typical wireless access point has several antennas, modulators, and processors. The processors execute network applications like Physical Layer (PHY), Media Access Control (MAC), Radio Link Control (RLC), Packet Data Convergence Protocol (PDCP), Radio Resource Control (RRC), and Service Data Application Protocol (SDAP). The network applications control the transmission and reception of the wireless signals.

The wireless access point receives the wireless signals from the wireless user devices over various directions-of-arrival. In the wireless access point, the PHY determines the direction-of-arrival of each wireless signal by processing the received signal energy, phase, and frequency at multiple antennas over time. The PHY uses the direction-of-arrival for beamforming. The PHY also uses the direction-of-arrival for Multiple User Multiple Input Multiple Output (MU-MIMO) reception.

With MU-MIMO, multiple user devices share the same time and frequency resource block for their wireless transmission to the wireless access point. The wireless access point receives wireless signals from multiple user devices in the same resource block but from different directions-of-arrival. In the wireless access point, the PHY separates the received signals based on their different directions-of-arrival. Before separation, the PHY digitally filters the received signals with a digital filter that is configured to pass energy from these particular directions-of-arrival and to block energy from other directions.

The PHY in the wireless access point also determines radio noise and uplink utilization. The wireless access point takes remedial action when radio noise or uplink utilization become excessive. Unfortunately, the PHY does not effectively and efficiently use MU-MIMO direction-of-arrival filtering to handle excessive radio noise or uplink utilization.

Technical Overview

Radio circuitry wirelessly serves User Equipment (UE) with dynamic direction-of-arrival reception. Control circuitry determines a primary direction-of-arrival for a user signal and configures a digital filter for the primary direction-of-arrival. Detection circuitry filters the user signal with the digital filter configured for the primary direction-of-arrival and recovers user data from the user signal. The control circuitry determines increased radio noise and/or uplink utilization reconfigures the digital filter for multiple directions-of-arrival. The detection circuitry filters a subsequent user signal with the digital filter configured for the multiple directions-of-arrival and recovers additional user data from the subsequent user signal.

DETAILED DESCRIPTION

Figure 1:
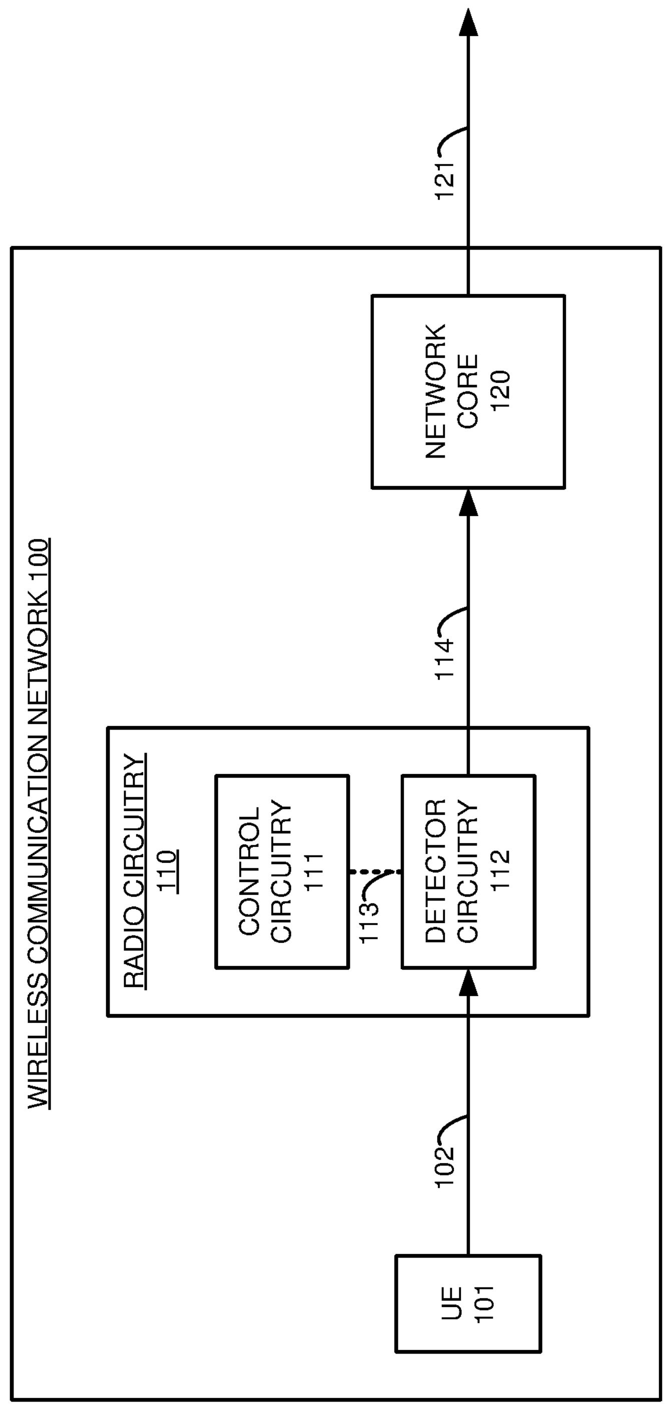
FIG. 1 illustrates a wireless communication network that wirelessly serves User Equipment (UE) with dynamic direction-of-arrival reception.

FIG. 1 illustrates wireless communication network 100 that wirelessly serves User Equipment (UE) 101 with dynamic direction-of-arrival reception. Communication network 100 comprises UE 101, radio circuitry 110, and network core 120. Radio circuitry 110 comprises control circuitry 111 and detector circuitry 112. Detector circuitry 112 is coupled to UE 101 over data link 102. Detector circuitry 112 is coupled to control circuitry 111 over data link 113. Detector circuitry 112 is coupled to network core 120 data link 114. Network core 120 is coupled to external systems over data link 121. Wireless communication network 100 has been simplified for clarity and typically includes many more UEs, radio circuitries, data links, and network cores.

Wireless data link 102 uses Institute of Electrical and Electronic Engineers (IEEE) 802.11 (WIFI), Fifth Generation New Radio (5GNR), Long Term Evolution (LTE), and/or some other wireless protocol. Data link 113 uses IEEE 802.3 (Ethernet), Internet Protocol (IP), Intra-Processor Communications (IPC), bus data protocol, or the like. Data link 114 uses Time Division Multiplex (TDM), Data Over Cable System Interface Specification (DOCSIS), Wave Division Multiplexing (WDM), Ethernet, IP, WIFI, 5GNR, LTE and/or the like. Data link 121 uses TDM, WDM, Ethernet, IP, and/or the like.

UE 101 comprises an apparatus having circuitry to wirelessly transmit user signals. UE 101 could be a robot, vehicle, computer, sensor, phone, and the like. UE 101 comprises radio circuitry and control circuitry. The radio circuitry comprises antennas, modulators, amplifiers, filters, digital/analog interfaces, processing circuitry, memory circuitry, firmware/software, and bus circuitry. The control circuitry comprises processing circuitry, memory circuitry, bus circuitry, and software. The software is stored in the memory circuitry and includes an operating system, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). In the control circuitry and the radio circuitry, the processing circuitry executes the operating systems and network applications to transmit user data for the user applications over wireless data link 102 to radio circuitry 110.

Radio circuitry 110 comprises control circuitry 111 and detector circuitry 112. Circuitry 111-112 comprises antennas, modulators, amplifiers, filters, digital/analog interfaces, processing circuitry, memory circuitry, firmware/software, and bus circuitry. The software is stored in the memory circuitry and includes operating systems and network applications. The network applications comprise PHY, MAC, RLC, PDCP, RRC, and SDAP. In radio circuitry 110, the processing circuitry executes the operating systems and network applications to receive user data over wireless data link 102 and transfer the user data to core network 120 over data link 114. Circuitry 111-112 comprises hardware like a Digital Signal Processors (DSPs), Central Processing Units (CPUs), Graphical Processing Units (GPUs), and/or Field Programmable Gate Arrays (FPGAs). In some examples, radio circuitry 110 includes a Multiple Input Multiple Output (MIMO) detector in the PHY of a Remote Radio Head (RRH).

Network core 120 comprises communication circuitry and control circuitry. The communication circuitry comprises digital/analog interfaces, processing circuitry, memory circuitry, firmware/software, and bus circuitry. The control circuitry comprises processing circuitry, memory circuitry, bus circuitry, and software. The software is stored in the memory circuitry and includes operating systems and network applications. In the control circuitry, the processing circuitry executes the operating systems and the network applications to receive and process user signals. In some examples, network core 120 is integrated within a wireless network slice and/or a Network Function Virtualization Infrastructure (NFVI).

Radio circuitry 110 receives a wireless signal from UE 101 over wireless data link 102. The wireless signal has a direction-of-arrival at radio circuitry 110. The direction-of-arrival has a geographic angle relative to direction—like north. For example, the geographic angle would be 90 degrees for UEs that are directly east of radio circuitry 110, and the geographic angle would be 270 degrees for UEs that are directly west of radio circuitry 110. The direction-of-arrival may also have an elevation azimuth relative to the ground. For example, the elevation azimuth would be −10 degrees for UEs on the ground, and the elevation azimuth might be 75 degrees for UEs in an airplane. The wireless signal also takes multiple paths. For example, a direct line-of-sight path from UE 101 to radio circuitry 110 may have 60% of the received energy, and a reflected path from UE 101 to radio circuitry 110 may have 25% of the received energy with the remaining energy spread across various other directions.

Control circuitry 111 determines a primary direction-of-arrival for the wireless user signal. The direction-of-arrival is determined based on the amount of energy and the phase of the received wireless signal at multiple antennas in radio circuitry 110. Control circuitry 111 configures a digital filter in detector circuitry 112 for the primary direction-of-arrival. Thus, energy from other directions-of-arrival is largely ignored, and energy from the primary direction-of-arrival is processed to recover the user data. Detector circuitry 112 filters the user signal with the digital filter configured for the primary direction-of-arrival and recovers the user data.

Control circuitry 111 determines radio noise and/or uplink utilization. In response to excessive radio noise and/or uplink utilization above a threshold, control circuitry 111 reconfigures the digital filter in detector circuitry 112 for multiple directions-of-arrival. Thus, energy from at least one other direction is processed to recover the user data. Detector circuitry 112 filters the user signal with the digital filter configured for multiple directions-of-arrival to recover the user data responsive to excessive radio noise and/or uplink utilization. The digital filter reconfiguration for UE 101 is similar to a Multiple User Multiple Input Multiple Output (MU-MIMO) filter configuration for multiple UEs at different locations.

When control circuitry 111 configures the digital filter for multiple directions-of-arrival, control circuitry 111 may first determine secondary directions-of-arrival for the wireless user signal and configure the digital filter for the primary direction-of-arrival and for the secondary directions-of-arrival. Thus, the multiple directions-of-arrival would correspond to the multi-path versions of the wireless user signal. In other examples, the multiple directions-of-arrival comprise offsets from the primary direction-of-arrival—like plus/minus 10 degrees—so the processing of secondary directions-of-arrival can be avoided.

Advantageously, radio circuitry 110 effectively and efficiently uses direction-of-arrival filtering to handle excessive radio noise or uplink utilization.

Figure 2:
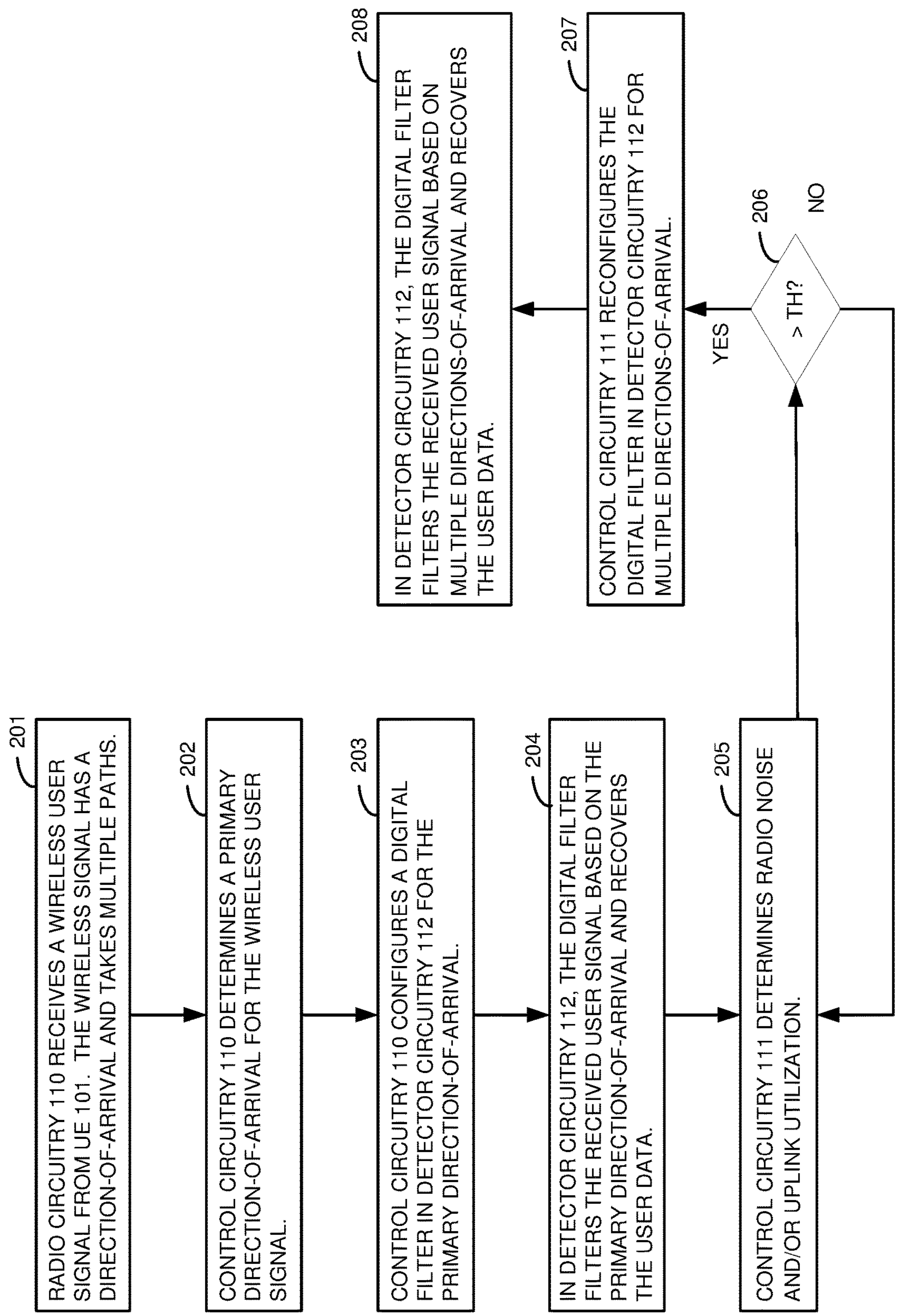
FIG. 2 illustrates the operation of the wireless communication network to wirelessly serve the UE with dynamic direction-of-arrival reception.

FIG. 2 illustrates the operation of wireless communication network 100 to wirelessly serve UE 101 with dynamic direction-of-arrival reception. Radio circuitry 110 receives a wireless user signal from UE 101 (201). The wireless signal has a direction-of-arrival and takes multiple paths. Control circuitry 110 determines a primary direction-of-arrival for the wireless user signal (202). Control circuitry 110 configures a digital filter in detector circuitry 112 for the primary direction-of-arrival (203). In detector circuitry 112, the digital filter filters the received user signal based on the primary direction-of-arrival and recovers the user data (204). Control circuitry 111 determines radio noise and/or uplink utilization (205). If the radio noise and/or the uplink utilization exceed their respective thresholds (206), then control circuitry 111 reconfigures the digital filter in detector circuitry 112 for multiple directions-of-arrival (207). In detector circuitry 112, the digital filter filters the received user signal based on multiple directions-of-arrival and recovers the user data (208). When the excessive noise and/or uplink utilization recedes, then control circuitry 111 may reconfigure the digital filter in detector circuitry 112 for the primary direction-of-arrival, and detector circuitry 112 again filters the received user signal based on a single direction-of-arrival.

Figure 3:
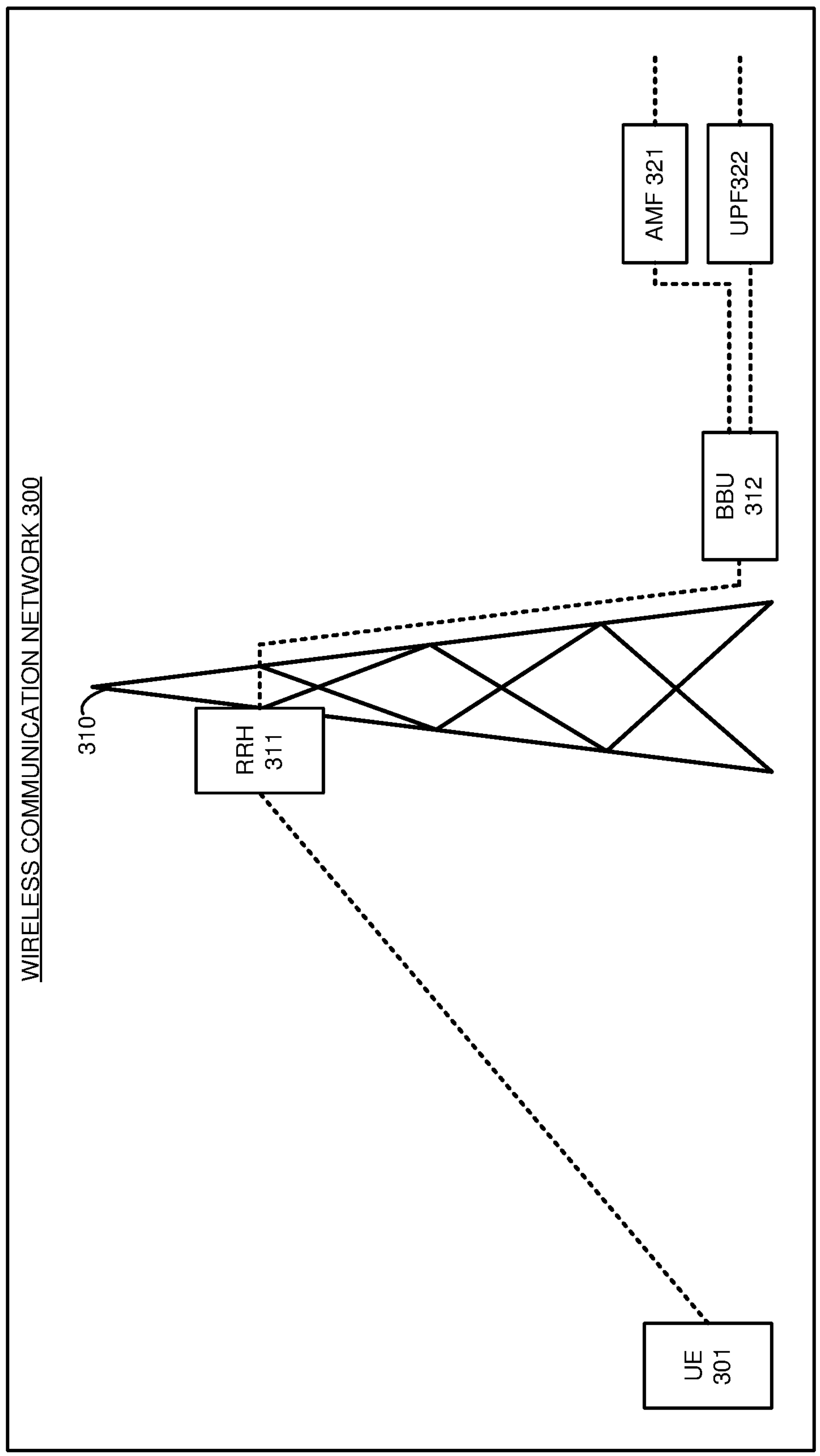
FIG. 3 illustrates a wireless communication network that wirelessly serves a UE with dynamic direction-of-arrival reception.

FIG. 3 illustrates a wireless communication network 300 that wirelessly serves UE 301 with dynamic direction-of-arrival reception. Wireless communication network 300 is an example of wireless communication network 100, although network 100 may differ. Wireless communication network 300 comprises UE 301, wireless access point 310, Access and Mobility Management Function (AMF) 321, and User Plane Function (UPF) 322. Wireless access point 310 comprises Remote Radio Head (RRH) 311 and Baseband Unit (BBU) 312. UE 301 and RRH 311 are coupled by a wireless data link. RRH 311 and BBU 312 are coupled by a wireless and/or wireline data link. BBU 312 is coupled to and AMF 321 and UPF 322 by wireless and/or wireline data links. AMF 321 and UPF 322 are coupled to various other systems.

RRH 311 receives a wireless signal from UE 301. The wireless signal takes multiple paths that have various directions-of-arrival. The directions-of-arrival have geographic angles and elevation azimuths. RRH 310 executes a Fifth Generation New Radio (5GNR) Physical Layer (PHY) that has a Multiple Input Multiple Output (MIMO) detector. The 5GNR PHY determines the primary direction-of-arrival for the wireless user signal by comparing the energy and phase of the received wireless signal at multiple antennas in wireless access point 310. The 5GNR PHY configures a digital filter for the primary direction-of-arrival. The 5GNR PHY filters the user signal based on a single direction-of-arrival to recover the user data. The 5GNR PHY uses a MIMO detector to recover the user data. The MIMO detector transfers the user data to another PHY component like a Forward Error Correction (FEC) module. RRH 311 transfers the user data to BBU 312. BBU 312 transfers the user data to UPF 322. BBU 312 transfers network signaling to AMF 321. AMF 321 and UPF 322 process the user data and the network signaling to serve UE 301 with wireless data communications.

RRH 311 determines radio noise and uplink utilization. In response to radio noise above a noise threshold and uplink utilization above a utilization threshold, the 5GNR PHY reconfigures its digital filter for multiple directions-of-arrival. The 5GNR PHY applies offsets to the primary direction-of-arrival to determine additional directions-of-arrival. For example, the PHY detector may add 5 degrees to the angle and azimuth to get one direction and subtract 5 degrees from the angle and azimuth to get another direction. The 5GNR PHY configures the digital filter to process the energy from all three directions-of-arrival and to ignore energy from other directions. The 5GNR PHY filters the user signal based on the multiple directions-of-arrival and recovers the user data. RRH 311 transfers the recovered user data to BBU 312. BBU 312 transfers the user data to UPF 322. BBU 312 transfers network signaling to AMF 321. AMF 321 and UPF 322 process the user data and network signaling to serve UE 301 with wireless data communications.

RRH 311 continuously reconfigures its digital filters for single or multiple directions of arrival based on radio noise and uplink utilization.

Figure 4:
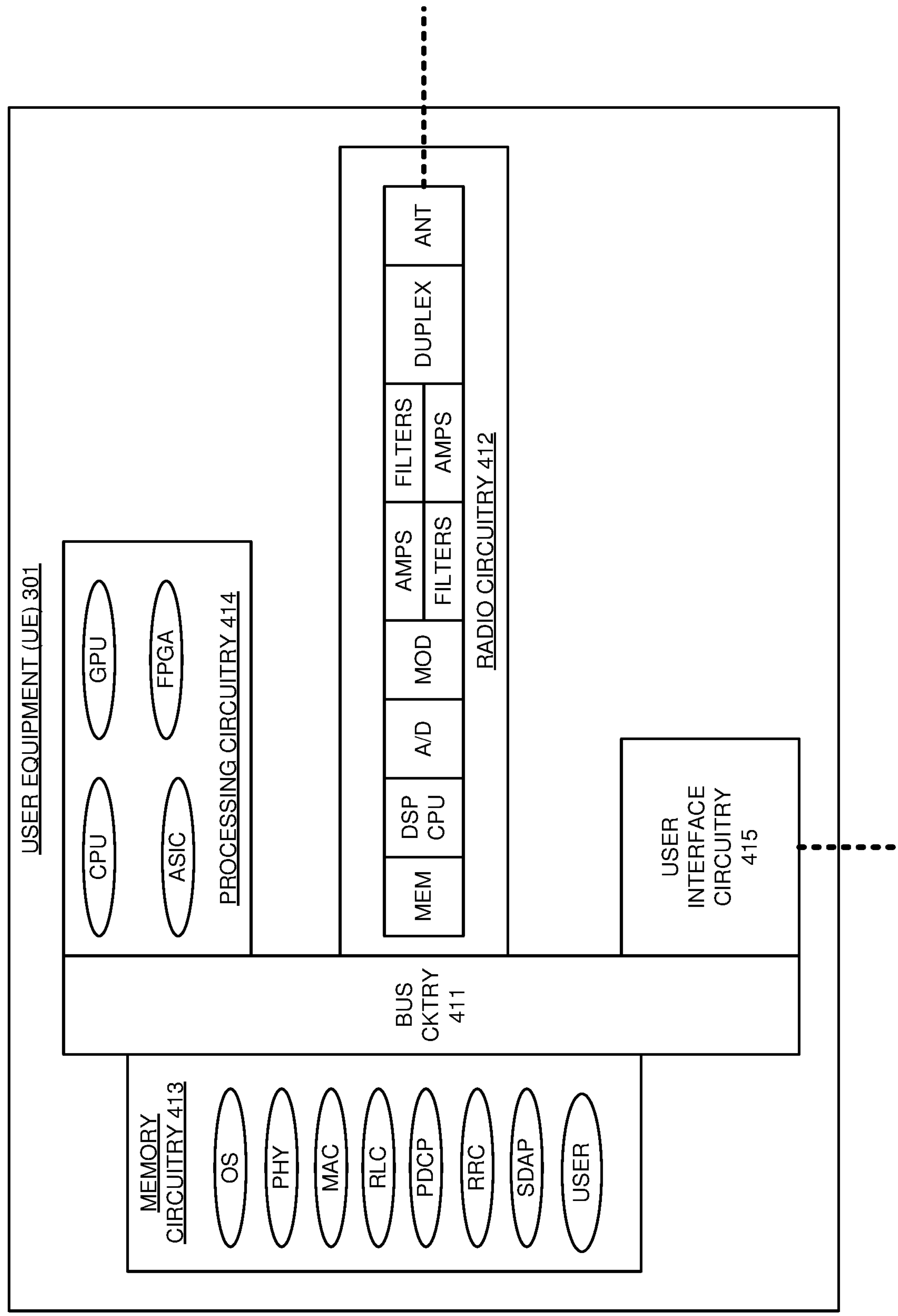
FIG. 4 illustrates a UE that transmits user signals which are dynamically filtered based on direction-of-arrival and noise.

FIG. 4 illustrates UE 301 that transmits user signals which are dynamically filtered based on direction-of-arrival, uplink utilization, and noise. UE 301 is an example of UE 101, although UE 101 may differ. UE 301 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415.

Memory circuitry 413 comprises volatile and non-volatile memories like RAM, flash, disc, tape, and the like. Memory circuitry 413 stores an operating system (OS), network applications, and user applications (User). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, FPGAs, and/or some other computer hardware. Processing circuitry 414 executes the operating system and user applications to generate user data. Processing circuitry 414 executes the operating system and the network applications to drive radio circuitry 412 to wirelessly exchange user data and network signaling. User interface circuitry 415 may comprise transceivers, machine controllers, graphic displays, sensors, cameras, and/or some other user components.

Radio circuitry 412 comprises antennas (ANT), duplexers (DUPLEX), filters, amplifiers (AMPS), modulators (MOD), Analog/Digital interfaces (A/D), DSP, CPU, and memory (MEM). The antennas in radio circuitry 412 exchange wireless signals with wireless access point 310. In radio circuitry 412, the DSP/CPUs execute firmware/software to drive the exchange of corresponding data signals between the antennas and memory circuitry 413. Processing circuitry 414 executes the operating system and network applications to drive the exchange of user data and network signaling between memory circuitry 413 and wireless access point 310. Processing circuitry 414 executes the operating system and user applications to generate and consume user data in memory circuitry 413.

The user applications generate user data like video or images. Through the operating system, the user applications exchange user data with the SDAP and exchange user signaling with the RRC. The SDAP maps between Service Data Units (SDUs) and QoS flows. The SDAP marks the QoS flows with the proper QoS. The RRC performs attachment and authentication. The RRC interacts with AMFs over N1 signaling to establish and terminate data sessions. The RRC handles authentication, security, handover operations, status reporting, QoS, system broadcasts, and network pages.

The RRC and the SDAP exchange Service Data Units (SDUs) with the PDCP. The PDCP maps between the SDUs and Protocol Data Units (PDUs) for the RLC. PDCP functions comprise security ciphering, header compression and decompression, sequence numbering and re-sequencing, de-duplication. The PDCP exchange PDUs with the RLC. The RLC maps between the PDUs and MAC logical channels. RLC functions comprise ARQ, sequence numbering and resequencing, segmentation and resegmentation. The RLC exchanges the data and signaling from the PDUs with the MAC over MAC logical channels. The MAC maps between the MAC logical channels and MAC transport channels. MAC functions include buffer status, power headroom, channel quality, Hybrid Automatic Repeat Request (HARQ), user identification, random access, user scheduling, and QoS. The MAC exchanges the user data and network signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping. The PHY exchanges the user data and network signaling with a PHY in wireless access point 310 over the PHY transport channels.

The user applications generate user data and signaling. The network applications store Uplink (UL) data that includes the user data and network signaling in the radio memory. In radio circuitry 412, the DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to wireless access point 310.

In radio circuitry 412, the antennas receive wireless Downlink (DL) signals from wireless access point 310 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data that includes user data and network signaling from the DL signals. The DSP/CPUs transfer the DL data to memory circuitry 413. The network applications process the DL data in memory circuitry 413 to forward user data and signaling to the user applications. The user applications process the user data and signaling to drive user interface circuitry 415.

Figure 5:
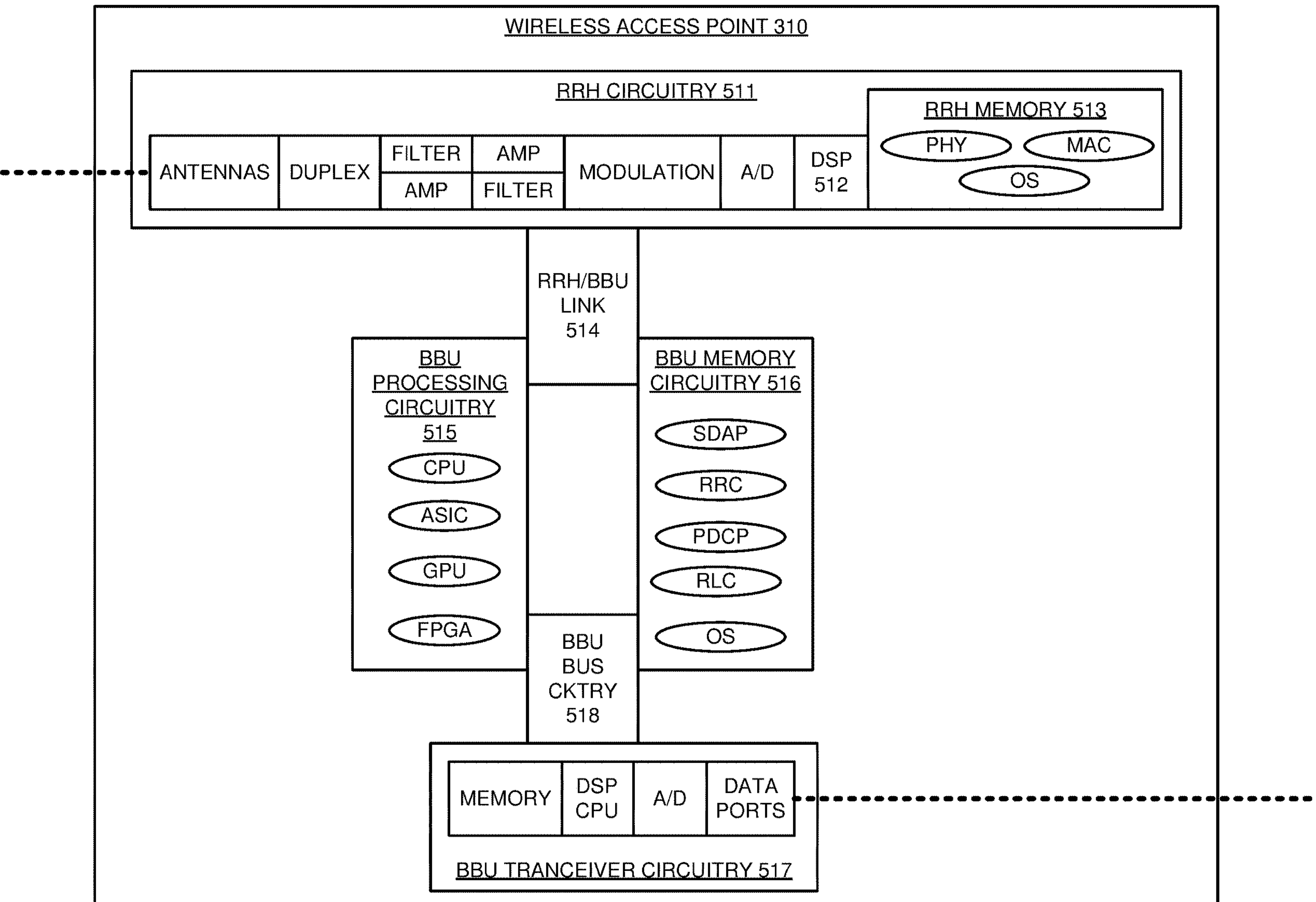
FIG. 5 illustrates a wireless access point that dynamically filters user signals based on direction-of-arrival and noise.

FIG. 5 illustrates wireless access point 310 that dynamically filters user signals based on direction-of-arrival, radio noise, and uplink utilization. Wireless access point 310 is an example of wireless access point 110, although access point 110 may differ. Wireless access point 310 comprises Remote Radio Head (RRH) circuitry 511, RRH/Baseband Unit (BBU) link 514, BBU processing circuitry 515, BBU memory circuitry 516, BBU transceiver circuitry 517, and BBU bus circuitry 518. RRH/BBU link 514 couples RRH circuitry 511 to BBU processing circuitry 515 and BBU memory circuitry 516. BBU bus circuitry 518 couples BBU processing circuitry 515, BBU memory circuitry 516, and BBU transceiver circuitry 517.

BBU processing circuitry 515 comprises CPUs, GPUs, ASICs, FPGAs, and/or some other computer circuitry. BBU memory circuitry 516 comprises volatile and non-volatile memories like RAM, flash, disc, tape, and the like. BBU memory circuitry 516 stores an operating system and network applications. In this example, the network applications comprise RLC, PDCP, RRC, and SDAP. BBU circuitry 515-516 may host all network applications (including PHY), no network applications, or some network applications. BBU processing circuitry 515 executes the operating system and network applications to exchange user data and signaling between RRH circuitry 511 and BBU transceiver circuitry 517.

RRH circuitry 511 comprises antennas, duplexers, filters, amplifiers, modulators, A/D interfaces, DSP 512 and RRH memory 513. RRH memory 513 comprises volatile and non-volatile memories like RAM, flash, and the like. RRH memory 513 stores an operating system and network applications. In this example, the network applications comprise PHY and MAC. RRH circuitry 511 may host all network applications, no network applications, or some network applications (including PHY). In this exemplary split, the MAC in RRH circuitry 511 and the RLC in BBU circuitry 515-516 communicate over MAC logical channels that traverse RRH/BBU link 514. DSP 512 executes the operating systems and network applications to exchange user data and signaling between RRH memory 513 and UE 301 over RRH circuitry 511.

The SDAP exchanges N3 data between UPF 322 and the PDCP. The SDAP maps between SDUs and N3 data and marks the N3 data with the proper QoS. The RRC exchanges N1 signaling between UE 301 and AMF 321. The RRC generates and exchanges N2 signaling with AMF 321. The RRC supports UE attachment and authentication. The RRC establishes and terminates data sessions. The RRC handles security, handover operations, status reporting, QoS, system broadcasts, and network pages. The RRC and the SDAP exchange the SDUs with the PDCP.

The PDCP maps between the SDUs and PDUs for the RLC. PDCP functions comprise security ciphering, header compression and decompression, sequence numbering and re-sequencing, de-duplication. The PDCP exchange PDUs with the RLC. The RLC maps between the PDUs and MAC logical channels. RLC functions comprise ARQ, sequence numbering and resequencing, segmentation and resegmentation. The RLC exchanges the data and signaling from the PDUs with the MAC over MAC logical channels that traverse RRH/BBU link 514.

In RRH DSP 512, the MAC maps between the MAC logical channels and MAC transport channels. MAC functions include buffer status, power headroom, channel quality, HARQ, user identification, random access, user scheduling, and QoS. The MAC exchanges the user data and network signaling with the PHY over the MAC transport channels. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The PHY exchanges user data and network signaling with a PHY in UE 301 over the PHY transport channels.

In RRH circuitry 511, the antennas receive wireless UL signals from UE 310 and transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for DSP 512. DSP 512 executes the network applications to recover and store UL data and signaling in BBU memory circuitry 516. In DSP 512, the PHY dynamically filters the UL signals based on one or more directions-of-arrival. In BBU processing circuitry 515, the BBU network applications process the recovered UL data and signaling from memory circuitry 516 and generate additional UL signaling. The BBU network applications forward the UL data and signaling from memory circuitry 516 to AMF 321 and UPF 322 over BBU circuitry 517-518.

BBU transceiver circuitry 517 receives DL data and signaling from AMF 321 and UPF 322 and stores the DL data and signaling in memory circuitry 516. The BBU network applications process the DL data and signaling in memory circuitry 516 generate additional DL signaling. The BBU network applications forward the DL data and signaling to the RRH network applications in RRH circuitry 511. In RRH circuitry 511, the network applications drive DSP 512 to transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to UE 301.

Figure 6:
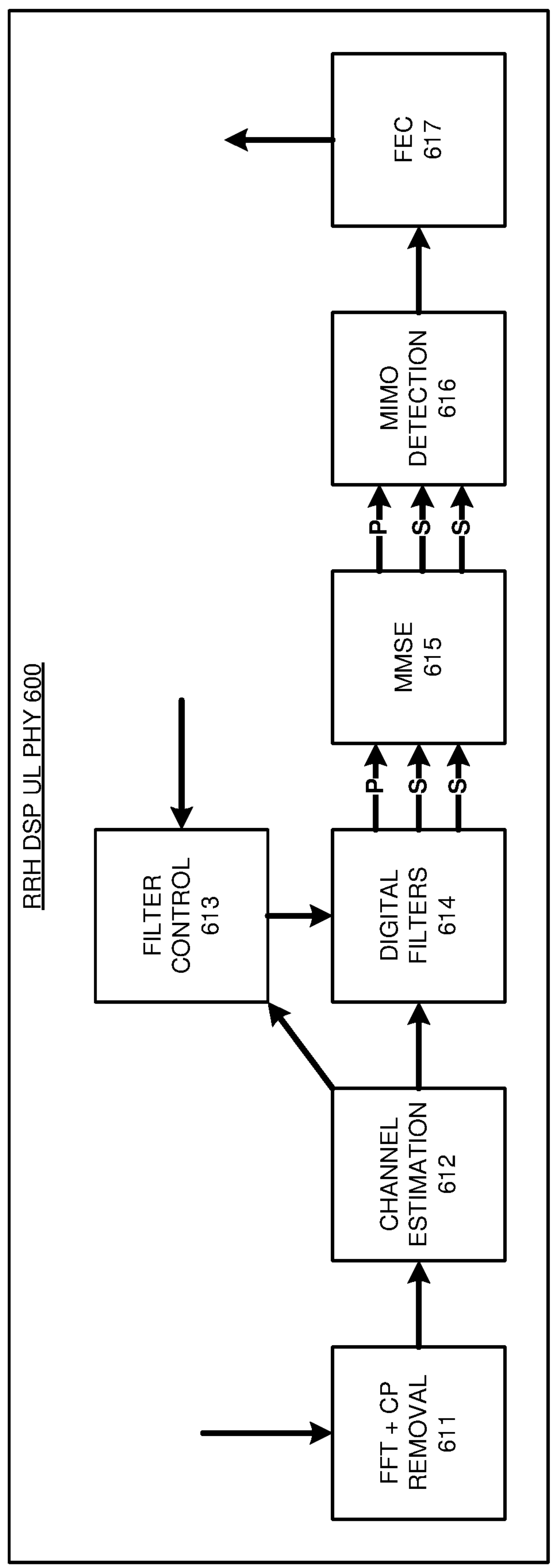
FIG. 6 illustrates Remote Radio Head (RRH) Digital Signal Processor (DSP) Uplink (UL) Physical Layer (PHY) that dynamically filters user signals based on direction-of-arrival and noise.

FIG. 6 illustrates RRH DSP UL PHY 600 that dynamically filters user signals based on direction-of-arrival, uplink utilization, and radio noise. RRH DSP UL PHY 600 is an example of radio circuitry 110, RRH 311, and DSP 512, although these components may differ. RRH DSP UL PHY 600 comprises Fast Fourier Transform (FFT)+Cyclic Prefix (CP) Removal 611, channel estimation 612, filter control 613, digital filters 614, Minimum Mean Squared Error (MMSE) 614, MIMO detector 616, and Forward Error Correction (FEC) 617. RRH DSP UL PHY 600 maps between UL PHY transport channels and UL MAC transport channels. RRH DSP UL PHY 600 performs packet deformation, de-windowing, guard-deletion, de-parsing, control removal, de-interleaving, FEC decoding, rate de-matching, descrambling, modulation de-mapping, channel estimation, channel equalization, FFTs, channel decoding, layer de-mapping, IDFTs, and RE de-mapping.

In particular, FFT+CP Removal 611 receives digital user data from other PHY components that receives the digital user data from A/D circuitry. FFT and CP Removal 611 remove the cyclic prefix and transform time-domain user data into frequency-domain user data for channel estimation 612. Channel estimation 612 processes the frequency-domain user data to determine radio measurements like signal strength, noise, and direction-of-arrival. Channel estimation 612 transfers the radio measurements to filter control 613. Filter control 613 also receives uplink utilization from another PHY component or the MAC. When the noise or uplink utilization remain below their thresholds, then filter control 613 configures digital filters 614 to apply filtering for the primary direction-of-arrival. When the noise or uplink utilization exceed their thresholds, then filter control 613 configures digital filters 614 to apply filtering for the primary direction-of-arrival and a secondary direction-of-arrival. If the noise or uplink utilization continues to exceed the thresholds, then filter control 613 configures digital filters 614 to apply filtering for the primary direction-of-arrival and two secondary directions-of-arrival.

Digital filters 614 respond to filter control instructions from filter control 613. Digital filters 614 filter frequency-domain user data based on a single direction-of-arrival so energy from the primary direction is processed and energy from other directions is suppressed. For example, digital filters 614 may use a Single User Multiple Input Multiple Output (SU-MIMO) filter configuration. Digital filters 614 also filter frequency-domain user data based on a multiple directions-of-arrival so energy from the multiple directions is processed and energy from the remaining directions is suppressed. For example, digital filters 614 may use a Multiple User MIMO (MU-MIMO) filter configuration for a single UE. Thus, digital filters 614 filter the user signals from multiple directions-of-arrival from a single UE as if they were transmitted from multiple directions-of-arrival by multiple UEs. Digital filters 614 transfer filtered signals for each direction-of-arrival to MMSE 615, where the primary direction signal is denoted by a "P" and the secondary direction signals are denoted by an "S".

When noise or uplink utilization are below their thresholds, then only the P signal is used. When noise or uplink utilization are above their thresholds, then the P signal and one or more S signals are used. Minimum Mean Squared Error (MMSE) 614 processes the filtered frequency-domain user data to detect MMSE from the estimated signal. MIMO detector 616 processes the MMSE and the filtered frequency-domain user data to synthesize a single version of the time-domain user data. FEC 617 processes the time-domain user data to detect and correct errors. FEC 617 transfers the corrected user data to other PHY components for processing and delivery to the MAC.

Advantageously, the PHY can effectively and efficiently use MU-MIMO direction-of-arrival filtering to handle excessive radio noise or uplink utilization.

The wireless data network circuitry described above comprises computer hardware and software that form special-purpose network circuitry that performs multiple direction-of-arrival signal reception. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry that performs multiple direction-of-arrival signal reception.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating radio circuitry to wirelessly serve User Equipment (UE) with dynamic direction-of-arrival reception, the method comprising:

control circuitry determining a primary direction-of-arrival for a user signal and responsively configuring a digital filter for the primary direction-of-arrival;

detection circuitry filtering the user signal with the digital filter configured for the primary direction-of-arrival and recovering user data from the user signal;

the control circuitry determining increased radio noise and responsively reconfiguring the digital filter for multiple directions-of-arrival; and the detection circuitry filtering a subsequent user signal with the digital filter configured for the multiple directions-of-arrival and recovering additional user data from the subsequent user signal.

2. The method of claim 1 further comprising:

the control circuitry determining increased uplink utilization; and wherein the control circuitry reconfiguring the digital filter for the multiple directions-of-arrival comprises control circuitry reconfiguring the digital filter for the multiple directions-of-arrival responsive to the increased radio noise and the increased uplink utilization.

3. The method of claim 1 wherein the multiple directions-of-arrival for the user signal correspond to multi-path versions of the user signal.

4. The method of claim 1 wherein the multiple directions of arrival for the user signal comprise the primary direction-of-arrival and secondary directions-of-arrival.

5. The method of claim 1 further comprising:

the control circuitry determining additional directions-of-arrival for multi-path versions of the user signal; and wherein the control circuitry reconfiguring the digital filter for the multiple directions-of-arrival comprises the control circuitry reconfiguring the digital filter for the additional directions-of-arrival for the multi-path versions of the user signal.

6. The method of claim 1 wherein;

the control circuitry configuring the digital filter for the primary direction-of-arrival comprises the control circuitry configuring the digital filter to use a Single User Multiple Input Multiple Output (SU-MIMO) filter configuration for the UE; and the control circuitry reconfiguring the digital filter for the multiple directions-of-arrival comprises the control circuitry configuring the digital filter to use a Multiple User MIMO (MU-MIMO) filter configuration for the UE.

7. The method of claim 1 wherein the control circuitry and the detector circuitry comprise a remote radio head.

8. The method of claim 1 wherein the control circuitry and the detector circuitry comprise radio circuitry executing a Fifth Generation New Radio (5GNR) Physical Layer (PHY).

9. The method of claim 1 wherein the control circuitry and the detector circuitry comprise radio circuitry executing a Long Term Evolution (LTE) Physical Layer (PHY).

10. The method of claim 1 wherein the detector circuitry comprises a Multiple Input Multiple Output (MIMO) detector.

11. Radio circuitry to wirelessly serve User Equipment (UE) with dynamic direction-of-arrival reception, the radio circuitry comprising:

control circuitry configured to determine a primary direction-of-arrival for a user signal and responsively configure a digital filter for the primary direction-of-arrival;

detection circuitry configured to filter the user signal with the digital filter configured for the primary direction-of-arrival and recover user data from the user signal;

the control circuitry configured to determine increased radio noise and responsively reconfigure the digital filter for multiple directions-of-arrival; and the detection circuitry configured to filter a subsequent user signal with the digital filter configured for the multiple directions-of-arrival and recover additional user data from the subsequent user signal.

12. The radio circuitry of claim 11 further comprising:

the control circuitry configured to determine increased uplink utilization; and the control circuitry configured to reconfigure the digital filter for the multiple directions-of-arrival responsive to the increased radio noise and the increased uplink utilization.

13. The radio circuitry of claim 11 wherein the multiple directions-of-arrival for the user signal correspond to multi-path versions of the user signal.

14. The radio circuitry of claim 11 wherein the multiple directions of arrival for the user signal comprise the primary direction-of-arrival and secondary directions-of-arrival.

15. The radio circuitry of claim 11 further comprising:

the control circuitry configured to determine additional directions-of-arrival for multi-path versions of the user signal; and the control circuitry configured to reconfigure the digital filter for the additional directions-of-arrival for the multi-path versions of the user signal.

16. The radio circuitry of claim 11 wherein;

the control circuitry configured to configure the digital filter to use a Single User Multiple Input Multiple Output (SU-MIMO) filter configuration for the UE; and the control circuitry configured to reconfigure the digital filter to use a Multiple User MIMO (MU-MIMO) filter configuration for the UE.

17. The radio circuitry of claim 11 wherein the control circuitry and the detector circuitry comprise a remote radio head.

18. The radio circuitry of claim 11 wherein the control circuitry and the detector circuitry comprise radio circuitry executing a Fifth Generation New Radio (5GNR) Physical Layer (PHY).

19. The radio circuitry of claim 11 wherein the control circuitry and the detector circuitry comprise radio circuitry executing a Long Term Evolution (LTE) Physical Layer (PHY).

20. The radio circuitry of claim 11 wherein the detector circuitry comprises a Multiple Input Multiple Output (MIMO) detector.

* * * * *